No. 863,742. PATENTED AUG. 20, 1907.
E. McGRAW.
VEHICLE TURNING GEAR.
APPLICATION FILED MAY 16, 1906.
2 SHEETS—SHEET 2.
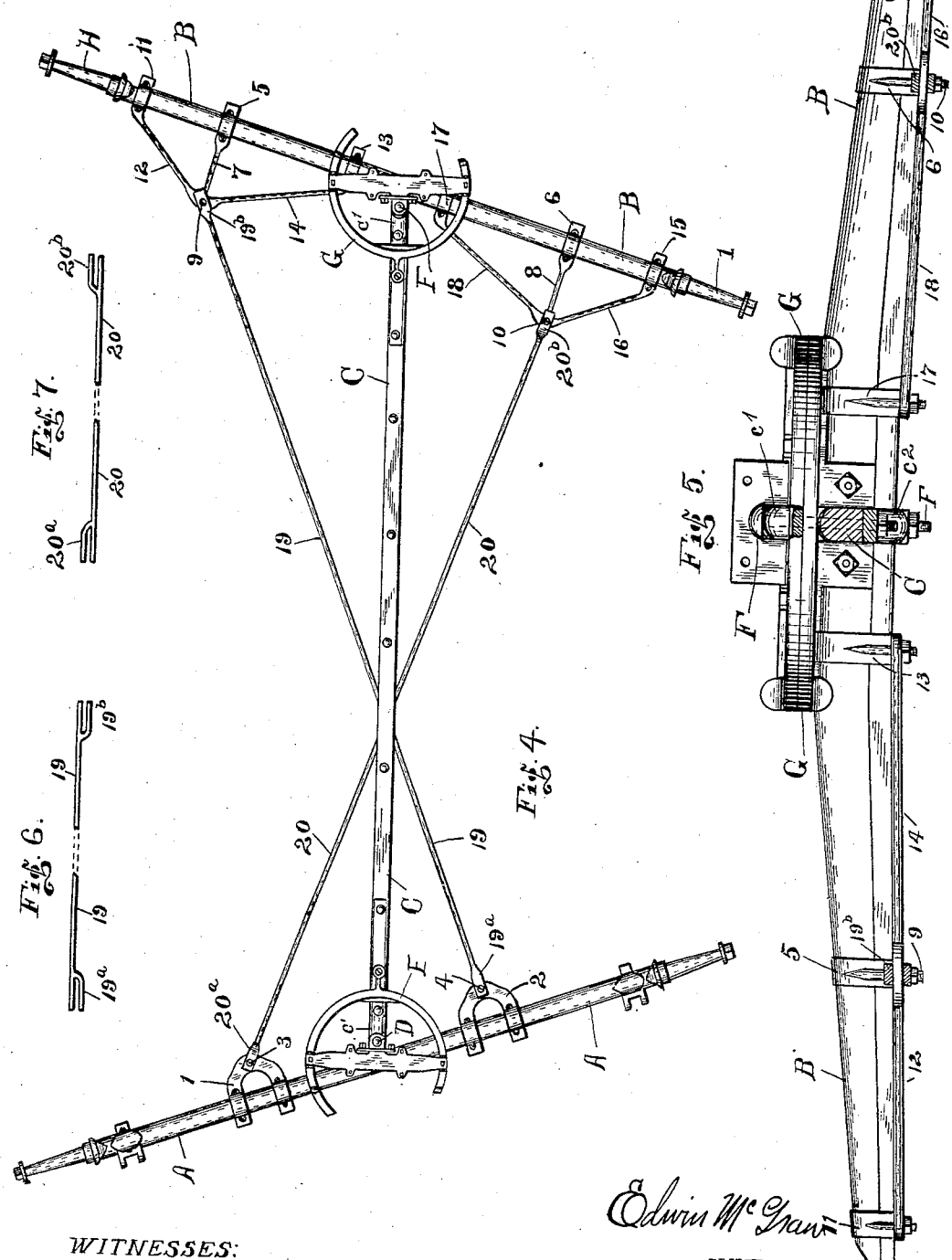
WITNESSES:
Adelaide Kearns.
R. E. Randle.
INVENTOR
Edwin McGraw
BY Robert W. Randle
ATTORNEY.

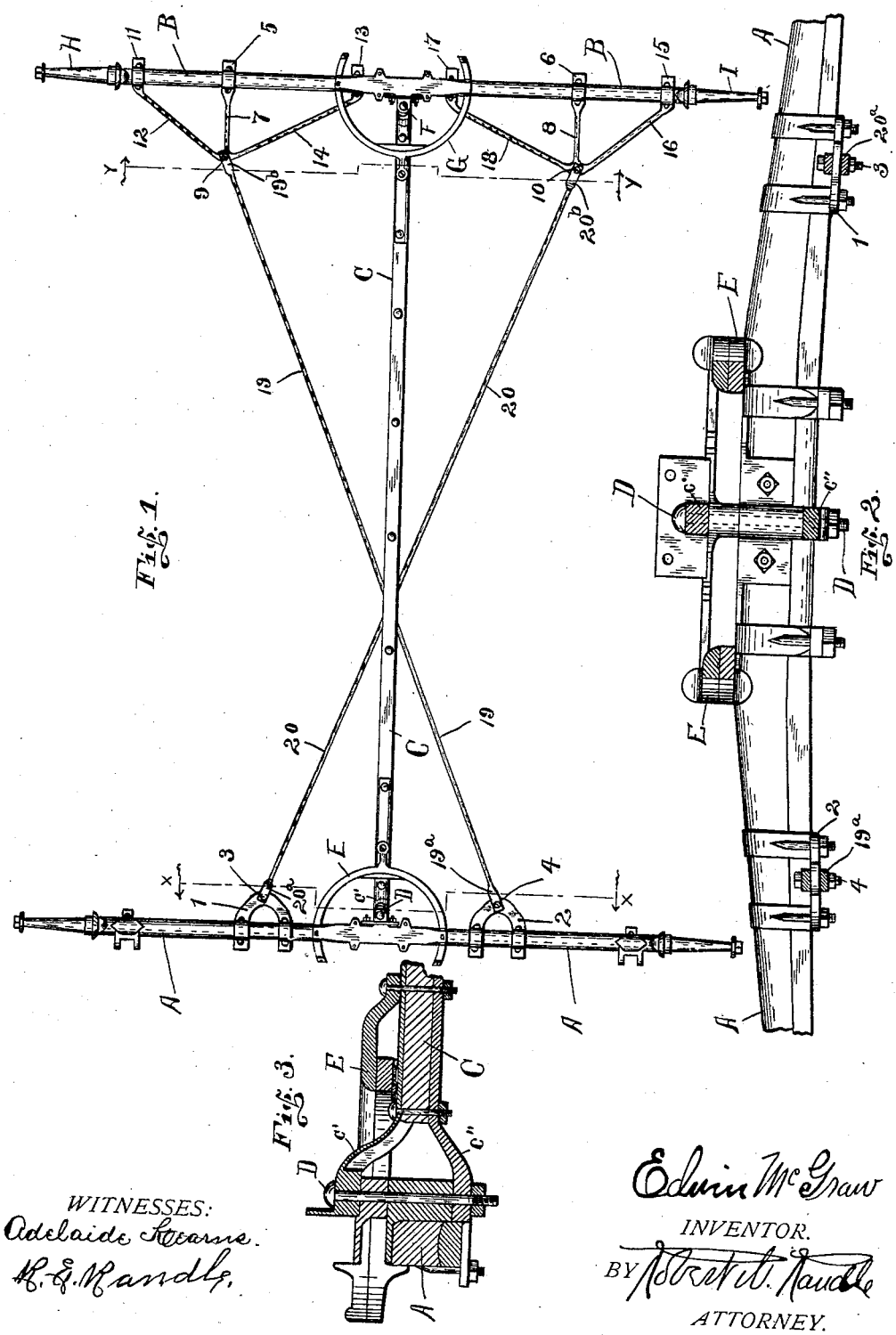

UNITED STATES PATENT OFFICE.

EDWIN McGRAW, OF FALMOUTH, INDIANA.

VEHICLE TURNING-GEAR.

No. 863,742.      Specification of Letters Patent.      Patented Aug. 20, 1907.

Application filed May 16, 1906. Serial No. 317,075.

To all whom it may concern:

Be it known that I, EDWIN McGRAW, a citizen of the United States, residing at Falmouth, in the county of Rush, and in the State of Indiana, have invented certain new and useful Improvements in Vehicle Turning-Gears, of which the following is a full and accurate specification.

My invention relates to vehicles, and more particularly to the running gear, or turning gear, for vehicles; and the object of my invention, broadly speaking, is to provide a quick turning gear for vehicles, which will be simple and durable in construction, symmetrical and mechanically efficient in appearance and operation, and which can be manufactured and sold at a comparatively low price.

More specifically stated my object is to provide a vehicle gear which will allow a vehicle to be turned in a small compass of space, in which both the front and rear wheels may contribute to turning the vehicle, thereby reducing the radius required for turning vehicles containing my invention. And, finally, a further object is to provide a turning-gear which may be adjusted to various styles and makes of vehicle-bodies, and to various heights of wheels, and whereby the difference in the height of the front and the rear wheels may be accounted for and adjustments made in my mechanism accordingly, in order to meet varying conditions.

Other objects and particular advantages will present themselves in the course of the ensuing specification and exposition.

Probably the best exemplification of my invention is shown most clearly in the accompanying two sheets of drawings, in which—

Figure 1 is a top plan view of a vehicle-gear constructed in accordance with my invention, showing the parts in their normal positions; Fig. 2 is an inside elevation, partly in section, as taken on the line X—X of Fig. 1, and taken in the direction indicated by the arrows on said line; Fig. 3 is a detail central sectional view of a pivotal connection of the reach-pole, particularly with the front axle, and also being applicable to the connection of the reach pole with the rear axle; Fig. 4 is a top plan view of same parts shown in Fig. 1, the parts in this view are shown as in turning position; Fig. 5 is an inside elevation, partly in section, as taken on the line Y—Y of Fig. 1, and as taken in the direction indicated by the arrows on said line; and Figs. 6 and 7 are detail views showing in elevation the two connection-rods and their clips.

Similar reference characters denote like parts throughout the several views of the drawings.

In order that my invention and its several advantages may be fully understood and appreciated I will now take up the detail description thereof and will describe the several parts and the operations as briefly and as compactly as I may.

In the drawings the indices A and B denote the front and the rear axles, respectively, and the letter C denotes the reach pole. The front end of the reach pole is provided with an upper and a lower arm, $c'$ and $c''$ respectively, whereby it may be pivotally connected to the center of the axle A by means of the king-bolt D, as shown in Fig. 3, and a fifth-wheel mechanism E is employed which may be of any ordinary construction appropriate thereto, substantially as shown. The rear end of the reach pole C has likewise an upper and a lower arm, $c^1$ and $c^2$ respectively, whereby it may be pivotally connected to the center of the axle B by the king-bolt F, and a fifth-wheel mechanism G is employed to further pivotally connect the rear of the reach-pole to the rear axle B, which should be substantially the same as the front fifth-wheel E above referred to. From the above it is readily apparent that I now have the front and the rear axles pivotally connected to the reach pole.

My invention lies more particularly in the means for connecting the front and the rear axles independently of the reach-pole whereby they will turn synchronously in opposite direction.

The numerals 1 and 2 denote each a double clip adjustably secured to the front axle on either side of the fifth-wheel E, each pair being connected by a rearwardly projecting tongue-plate forming a part of its respective double clip, and a pivot aperture is formed vertically and centrally in each of said plates for the respective pivot-bolts 3 and 4, as shown.

Secured to the rear axle B, equidistant from the fifth-wheel G, are the clips 5 and 6, each having a forwardly extending arm 7 and 8, respectively. In the forward end of each of the arms 7 and 8 is formed a vertical aperture for the respective pivot-bolts 9 and 10. Secured to the outer portion of the right-hand end of the axle B, near the spindle H, is the clip 11 having an arm 12 extending forward and inwardly at an angle with its forward end integrally connected to the arm 7; and secured to the inner portion of the right-hand side of the axle B, at a point near the fifth-wheel G, is the clip 13 having an arm 14 extending forward and outwardly at an angle with its forward end integrally connected to the arm 7. Secured to the outer portion of the left-hand end of the axle B, near the spindle I, is the clip 15 having an arm 16 extending forward and inwardly at an angle with its forward end integrally connected to the arm 8; and secured to the inner portion of the right-hand side of the axle B, at a point near the fifth-wheel G, is the clip 17 having an arm 18 extending forward and outwardly at an angle with its forward end integrally connected to the arm 8. It will be seen that each composite clip so formed on the rear axle occupies substantially half of that member, thus enabling the rear connections of the rods 19 and 20, now to be described, to be most efficiently braced. I find that the rear clips may be given this large extent, since they need be adjusted but little, if at all, practically all necessary adjustment being afforded by the front clips 2 and 3.

The numerals 19 and 20 designate each a connecting-rod, each having forked-clips 19$^a$—19$^b$, and 20$^a$—20$^b$, respectively, formed on their respective front and rear ends, substantially as indicated. The clips 19$^a$ and 20$^a$ are adapted to stride the central rear extension of the respective clips 1 and 2, being pivotally connected therewith by the respective bolts 3 and 4; and in like manner the clips 19$^b$ and 20$^b$ are pivotally connected by the respective bolts 9 and 10 to the rearward ends of the respective arms 7 and 8. By the above it will be noticed that the connecting-rods 19 and 20 are caused to cross each other underneath the reach-pole. By the arrangement of the clips of the connecting-rods it will be seen that although they cross each other they will not contact with each other, neither will they contact with the reach-pole. Thus, the clips of the upper rod 19 are offset to the lower side of the rod, while the clips of the rod 20 are offset to the upper side thereof. The two rods are prevented from contacting with the reach pole by reason of the fact that the rod-attaching portions of the four axle clips are disposed well below the horizontal plane of the pole.

The operation of my invention will be notably apparent from an inspection of the drawings, by which it will be understood that in practice the front axle A may be provided with the ordinary shafts or tongue, and that the spindles of each axle will have wheels mounted thereon in the usual manner, and also that a head-block may be carried on each of the fifth-wheels by which a vehicle body may be mounted securely above the gear. It will now be seen that by turning the axle A to the left, for instance, the rear axle B will of necessity be turned to the right as shown in Fig. 4 thereby allowing the vehicle to be turned in approximately one-half the space required if the rear axle was stationary, and conversely, if the axle A be turned to the right then the axle B will be turned to the left. By reason of the rear ends of the connecting-rods being pivoted farther apart, ordinarily, than are the front ends thereof it is evident that the rear axle will not turn to an acute angle as does the front axle, as I have found that the rear axle should not be displaced in turning as much as it is necessary to displace the front axle. Said movement being accomplished by having the forward ends of the connecting-rods adjustably mounted to the front axle whereby the forward end of the connecting-rods may be adjusted laterally to meet varying conditions or preferences.

The above construction and arrangement of parts I have found to give a very flexible and easily managed turning-gear, and at the same time requiring only a minimum number of parts, and at the same time not adding perceptibly to the weight of the vehicle or to the cost thereof.

I desire that it be understood that various changes and modifications may be made in the details shown and described without departing from the spirit of my invention.

Having now shown and described my invention, its operation, and the preferred construction thereof, what I claim and desire to secure by Letters Patent of the United States, is—

In a short turning gear, a reach pole, front and rear axles pivoted to the ends thereof, a pair of narrow clips adjustably mounted on the front axle at either side of the reach pole and each adjustable over substantially the half of the axle, and a pair of composite clip members secured to the rear axle at either side of the reach pole, each of said members consisting of three clips mounted on the axle, one closely adjacent the end thereof, one closely adjacent the reach pole, and the third intermediate, an integral arm extending forward from said intermediate clip, and converging oblique arms integral with the other two clips and joined integrally to the end of said forwardly extending arm, in combination with crossed rods pivoted at their forward ends to said narrow clips and at their rear ends to the junctions of said arms.

In testimony whereof I have hereunto signed my name to this specification in the presence of two subscribing witnesses.

EDWIN McGRAW.

Witnesses:
R. W. RANDLE,
R. E. RANDLE.